H. J. KUBIAK.
INDICATOR FOR CAMERAS.
APPLICATION FILED SEPT. 7, 1917.
1,278,080.
Patented Sept. 3, 1918.
2 SHEETS—SHEET 1.
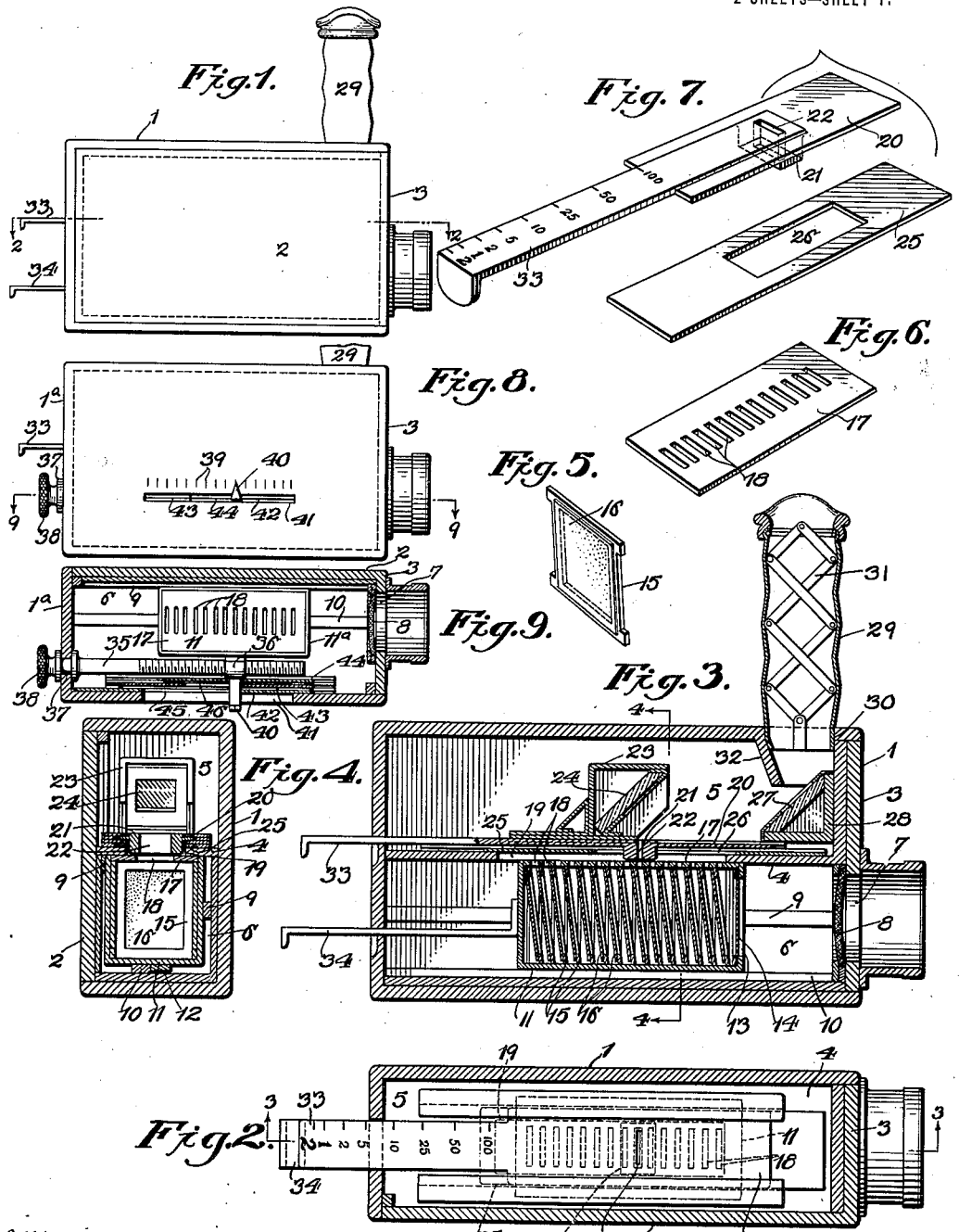
Witnesses
H. Harwood
C. R. Ziegler
Inventor
Henry J. Kubiak
By Joshua R. H. Potts
His Attorney

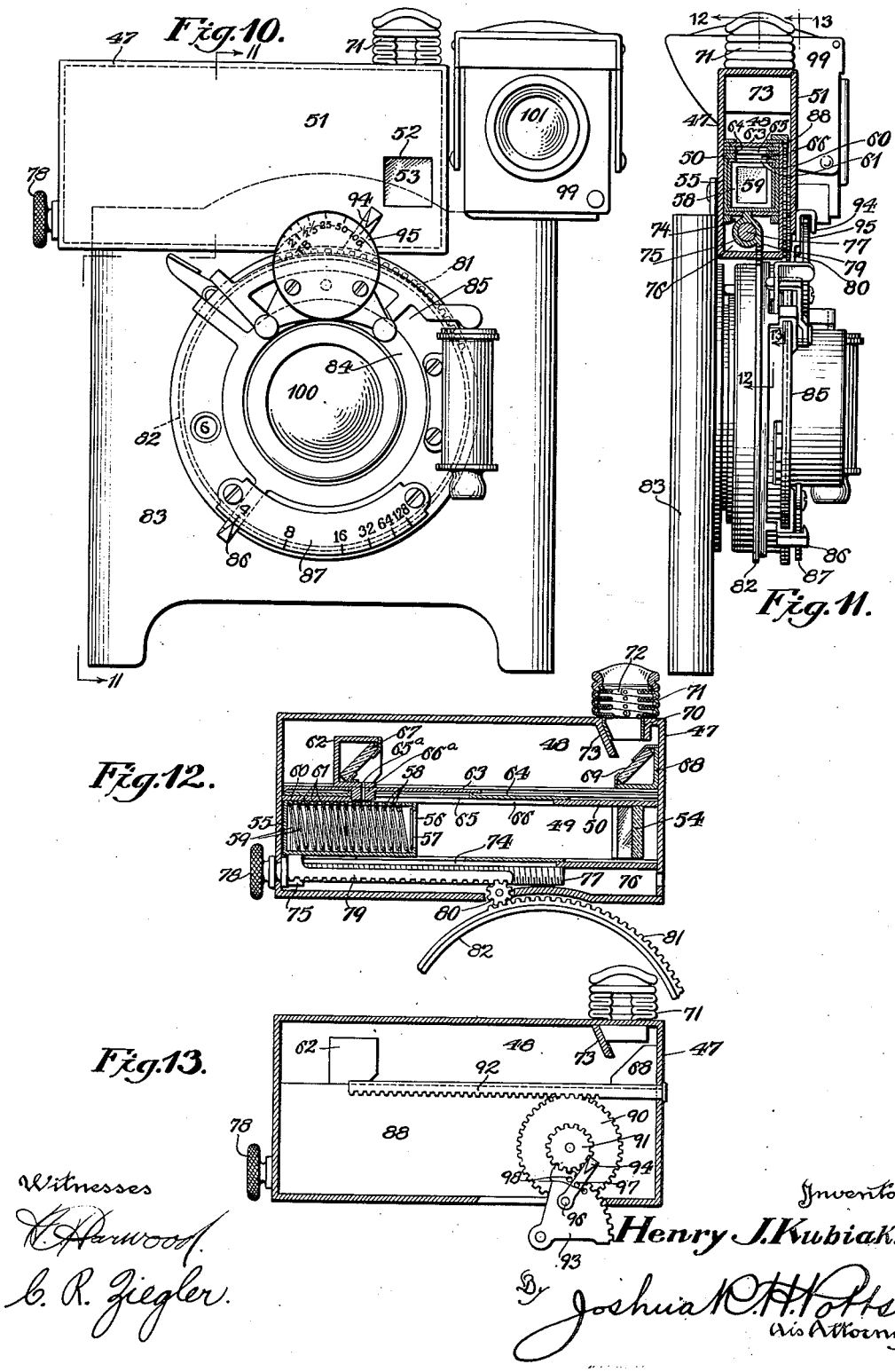

UNITED STATES PATENT OFFICE.

HENRY JOSEPH KUBIAK, OF PHILADELPHIA, PENNSYLVANIA, ASSIGNOR OF ONE-HALF TO JOSEPH STASINSKI, OF PHILADELPHIA, PENNSYLVANIA.

INDICATOR FOR CAMERAS.

1,278,080.      Specification of Letters Patent.      Patented Sept. 3, 1918.

Application filed September 7, 1917. Serial No. 190,130.

*To all whom it may concern:*

Be it known that I, HENRY J. KUBIAK, a citizen of Russia, residing at Philadelphia, in the county of Philadelphia and State of Pennsylvania, have invented certain new and useful Improvements in Indicators for Cameras, of which the following is a specification.

One object of my invention is to provide an indicator which can be used separately or in connection with cameras to determine the proper diaphragm opening and shutter speed to set the camera in order to make a correct exposure.

Another object is to so construct my invention that it will determine whether it is possible to secure a proper exposure if an optional shutter speed is to be used, and also what diaphragm is required to secure the proper exposure for said optional shutter speed.

One of the main objects of my invention is to enable anybody, even the most inexperienced person, to take good photographs under any light conditions, thus dispensing with guess work.

A further object is to make my invention of comparatively simple construction and so that it can be manufactured and sold at a reasonable cost.

These objects, and other advantageous ends which will be described hereinafter, I attain in the following manner, reference being had to the accompanying drawings in which—

Figure 1 is a side elevation of my invention.

Fig. 2 is an enlarged sectional plan view taken on the line 2—2 of Fig. 1.

Fig. 3 is a sectional elevation taken on the line 3—3 of Fig. 2.

Fig. 4 is a transverse section of my indicator taken on the line 4—4 of Fig. 3.

Fig. 5 is a perspective view of a frame and a sheet of transparent material in connection therewith which forms a part of my invention.

Fig. 6 is a perspective view of a slotted cover which forms one of the elements of my invention.

Fig. 7 is a detached perspective view of certain other elements of my invention.

Fig. 8 is a view of similar nature to Fig. 1 showing a modification of my invention.

Fig. 9 is a sectional plan view taken on the line 9—9 of Fig. 8.

Fig. 10 is a front elevation of a camera showing my invention connected thereto.

Fig. 11 is a section on the line 11—11 of Fig. 10, the portions of the camera being shown in outside view.

Fig. 12 is a section on the line 12—12 of Fig. 11, a portion of the connecting means between the camera and the indicator being illustrated.

Fig. 13 is a section on the line 13—13 of Fig. 11, only the direct connecting elements between the indicator and the camera being illustrated.

Referring to Figs. 1 to 7 inclusive, 1 represents an elongated rectangular case which has one side 2 and one end 3 removably secured. A partition 4 separates the case into two elongated compartments 5 and 6, one positioned above the other as clearly shown in Figs. 3 and 4. The end 3 of the case has an opening 7 backed by a lens 8 in alinement with the compartment 6.

The sides of the compartment 6 are provided with rails 9, and the bottom of this compartment is provided with a rail 10. Within the compartment 6, a box 11 is adapted to slide and is guided by the rails 9 and 10. The bottom of the box 11 has a strip 12 which engages the rail 10 as clearly shown in Fig. 4, so that the box is slidably retained within the compartment 6 and guarded against undesirable vibration.

The box 11, at its front, has an opening 13 which is backed by a sheet 14 of translucent materials such for example as white paraffin paper, which will permit the rays of light passing through the opening 7 and lens 8, to enter the box 11.

A plurality of frames 15 are positioned within the box and spaced apart from the front to the rear of the box as clearly shown in Fig. 3. Each of these frames has secured thereto a sheet 16 of translucent material, such for example as white paraffin tissue paper.

The frames 15 are tilted or inclined rearwardly as shown in Fig. 3 for a purpose hereinafter to be explained. A cover or grid 17 is designed to rest above the frames 15 and has a series of slots 18 which are so positioned that they register with the spaces between the separated frames 15.

The partition 4 has a slot 19 extending longitudinally thereof and directly above the slots 18 in the cover 17. A slidable plate 20 has a depending lug 21 and through this lug extends a substantially vertical slit 22 which is designed to register with any of the slots 18 in the cover 17 due to the relative sliding action between the plate 20 and the cover 17.

The plate 20 supports a hood 23 which is open at its forward end and this hood houses a mirror 24 which is arranged in the present instance at forty-five degrees to the horizontal and directly above the slit 22. A second slidable plate 25 is interposed between the plate 20 and the partition 4. This plate 25 has a slot 26 through which the lug 21 depends, the slot 26 being shorter than the slot 19 so that the lug 21 can be moved back and forward throughout the entire length of the slot 19 without uncovering said slot to the compartment 5 other than through the slit 22. Another mirror 27 is arranged in the present instance at forty-five degrees to the horizontal and is positioned within a bracket 28 arranged at the forward end of the compartment 5. This mirror 27 faces the mirror 24, so that any light projected upwardly through the slit 22, will be projected onto the mirror 24 and then reflected onto the mirror 27.

A flexible tubular eyepiece 29 has its lower end positioned within an opening 30 in the top of the case 1, the tubular eyepiece being in direct alinement with the mirror 27 so that any light projected on the mirror 27 will be reflected upwardly through the tubular eyepiece and can be seen by an observer looking downwardly through the tubular eyepiece.

The tubular eyepiece 29 is normally held in a collapsed position but when desired for use can be moved into the position shown in Fig. 3 and is held by a toggle or lazy tong connection 31. Shield 32 extends downwardly into the case 1 from the opening 30 into close proximity to the mirror 27. An elongated handle 33 is connected to the plate 20, so that the latter, together with the mirror 24 and lug 21, can be moved longitudinally toward or from the mirror 27, and also with respect to the grid of cover 17 of the box 11.

The box 11 also an elongated handle 34 so that the box can be moved longitudinally of the compartment 6 toward or from the lens 8 and with respect to the slit 24 in the lug 21.

It is obvious that light passing into the compartment 6, through the lens 8, will penetrate the sheet 14, and according to the strength of the light, will penetrate a greater or less number of the sheets 13. For example, if the light is weak, it might only penetrate the three sheets 16 which are adjacent the opening 13. However, if the light is strong, it might penetrate for example the first eight of the sheets 16 or even the entire number of sheets within the box 11. It is also obvious that if the box 11 is moved into close proximity to the lens 8, that the same strength of light will penetrate more sheets 16 than if the box were moved to the opposite end of the compartment 6.

The light as it penetrates the sheet 16, due to the tilting of the sheet 16 and frames 15, will be reflected upwardly through the slots 18 in the cover 17, and if the dependent lug 21 is moved over the slots which register with the sheets penetrated by the light, the rays of light will be projected through the slit 22 onto the mirror 24, and then reflected through the medium of the mirror 27 through the tubular eyepiece 29 and may be observed by a person placing their eye at the top of the tubular eyepiece and looking therethrough.

If the lug 21 is moved into a position above certain of the rear sheets 16 through which no light has penetrated, there will be no reflected light visible through the tubular eyepiece. I use this principle of the penetrativeness of the light through the translucent sheets 16 to determine the proper diaphragm and shutter speed to use for the strength of light existent at the time at which a photograph is to be taken. In the present instance, I graduate the top surface of the handle 34, said graduations being proportionate to the distance that the box 11 is from the forward end of the case 1. I number these graduations with similar marks as are used on the standard diaphragm gage of cameras, such for example as from 4 to 128. The handle 33 on its upper surface is also graduated throughout a portion of its length and these graduations correspond with the shutter speed graduations of a camera, the relation between the parts of my indicator having been previously calculated and depend upon the translucent properties of the material used for the sheets 16 and 14 and also the length of the case 1.

In the use of my invention as above described in connection with Figs. 1 to 7 inclusive, if a photographer desires to take a picture and elects a certain speed, say for example one-fifth of a second, he points the opening 7 and lens 8 toward the object to be photographed and moves the handle 33 until the indication marked one-fifth of a second is in alinement with the rear surface of the case 1. He then looks through the tubular eyepiece 29, and at the same time he slowly moves the handle 34 rearwardly, considering that the box 11 is at the forward end of the casing. Just as soon as he see a flash of light appear through the tubular eyepiece, he stops the movement of the handle 34 and observes what indication thereon is in alinement with the rear surface of the casing. This indicates the proper diaphragm opening to use for his camera to take a picture at the elected speed.

If the light conditions are such that it would be impossible to take a proper picture at the elected speed, no light will be visible through the tubular eyepiece no matter in what direction or in what manner he moves the handle 34. Thus, he is immediately told that it is impossible to take a good picture with the elected diaphragm under the existent light conditions. He may then choose a longer exposure and if the light is sufficiently strong, the rearward movement of the box 11 by the handle 34 will effect a flash of light through the last penetrated sheet 15 by the existent light at that particular time, thereby notifying the photographer of the proper diaphragm to use as above described.

In Figs. 8 and 9, I have shown a construction whereby the box 1ª which is of similar form, can be moved by means of an actuating screw 35 which engages a nut 36 on the side of the box. In this instance the screw 35 is held against longitudinal movement by means of a collar 37 and actuating knob 38 on the inner and outer surface of the casing 1ª.

Instead of making the graduations on the handle as shown at 34 in the form of my invention illustrated in Figs. 1 to 7 inclusive, I graduate the side of the case 1ª as indicated at 39 and secure a pointer 40 to the nut 36. The casing is slotted at 41 to permit the pointer 40 to project therethrough, and this slot is covered on the inside by three slidable plates 42, 43, and 44.

Plates 42 and 43 have slots 45 and 46 respectively while the plate 44 has no slot but merely a hole to permit the pointer 40 to penetrate the same. By this arrangement, light is prevented from entering the casing through the slot 41, in the same general manner as light is prevented from passing through the slot 19 by the plates 20 and 25 as above described.

In all other respects the form of my invention illustrated in Figs. 8 and 9 is similar to that described in connection with Figs. 1 to 7 inclusive, and I have therefore given corresponding parts similar reference numerals.

In Figs. 10 to 13 inclusive, I have shown a form of my invention connected directly to a camera and consists of a case 47 which is divided into two compartments 48 and 49 by a partition 50. The side 51 of the case 47 has an opening 52 in which is mounted a lens 53. A mirror 54 is arranged directly in line with said opening and at forty-five degrees so as to reflect light longitudinally of the compartment 49 in the same manner as the light is reflected longitudinally of the compartment 6 above described.

A box 55 has an opening 56 in its forward end which is covered by a sheet 57 of translucent material. A plurality of frames 58 are spaced apart from front to rear of the box and are tilted rearwardly as clearly shown in Fig. 12. These frames are each backed by a sheet 59 of translucent material and a cover 60 is mounted above the frames 58. This cover has a series of slots 61 which register with the spaces between the frames 58 in the same manner as the slots 18 register with the space between the frames 15 as described in the foregoing portion of the specification.

A hood 62 is secured to a plate 63 which is adapted to slide above another plate 64 which has a slot 65 running longitudinally thereof. The plate 64 is designed to cover a slot 66 in the partition 50 so as to prevent light from the partition 49 from entering the compartment 48 other than through a slit 65ª within a depending lug 66ª on the plate 63.

A mirror 67 is mounted within the hood 62 at an angle of forty-five degrees in the present instance, and a bracket 68 is mounted within the compartment 48 and has a mirror 69 which is arranged in the present instance at forty-five degrees and facing the mirror 67.

The case 47 has an opening 70 in its top and a flexible tubular eyepiece 71 has its lower end mounted within this opening. A toggle lever or lazy tong connection 72 is secured to the tubular eyepiece 71 so as to hold it in an extended position, but permits it to collapse into the position shown in Figs. 10 to 13 inclusive.

A shield 73 surrounds the opening 70, so that only direct reflected light from the mirror 67 to the mirror 69 will be projected upwardly through the tubular eyepiece. The bottom of the compartment 49 has a slot 74 to permit a nut 75 depending from the box 55 to project within a lower compartment 76.

A screw 77 extends through the nut 75 and has a knob 78 on its outer end whereby the screw 77 can be turned to move the box 55 longitudinally within the compartment 49. A toothed rack 79 is connected to the nut 75 and meshes with a pinion 80. This pinion in turn meshes with a toothed segment 81 on a ring 82, the rotation of said ring being operative to vary the size of the diaphragm opening of the camera 83 upon which the device is mounted.

The ring 83 has connection with another ring 84 on the front of the lens holder 85, and an indicating pointer 86 is connected to the ring 84 and is designed to travel in front of a segmental plate 87 which is graduated and numbered to indicate the size of the diaphragm opening as clearly illustrated in Figs. 10 and 11. It will thus be seen that by the rotation of the knob 78 that the box 55 will be moved longitudinally in the compartment 49 and the diaphragm will be simultaneously actuated through the medium of the mechanism just described.

The case 47 has an upright partition 88 which separates the compartments 48 and 49 from the side 51 of said case 47. The space thus provided forms a housing for a compound gearing including a large gear 90 and a smaller gear 91. The gear 90 meshes with a toothed rack 92 which is connected to the hood 62 while the gear 91 meshes with a toothed segment 93. This toothed segment is directly connected with the time-indicating pointer 94 on the camera and is movable adjacent to a disk 95 which is graduated and marked to indicate the speed of the shutter as clearly shown in Fig. 10.

In order to compensate for variations in temperature which, as well known, varies the required amount of shutter speed, I pivotally mount the pointer 94 on the segment 93 as shown at 96 in Fig. 13. I provide the pointer 94 with a pin 97 designed to engage any of a number of holes 98, hence the pointer can be changed relative to the segment 93 and this change will be imparted to the slit 65ª and hence change the relative positions between the box 55, slit 65ª, and markings on the disk 95.

It will be noted that the case 47 is so constructed that it can be placed adjacent the finder 99 of the camera, and lenses 100 and 101 of the camera, and finder respectively, are adjacent the opening 53 within the case 47 so that. the light passing inwardly through the opening 53 will be substantially the same as that passing into the camera through the lens 100 and into the finder through the lens 101.

In the operation of my invention shown in Figs. 10 to 13 inclusive, the movement of the pointer 94 into alinement with the elected marking of the disk 95 for setting the shutter, will also effect a movement of the slit 65 through the medium of the segment 93, gears 90, 91, 92, and hood 62. The knob 78 can then be turned to move the box 55 rearwardly into such position that a flash of light will be visible through the tubular eyepiece 71. This movement of the box imparts a corresponding movement to the diaphragm through the medium of the rack 79, pinion 80, segment 81, rings 82 and 84 to the indicator 86, and thus the diaphragm is simultaneously moved into the proper position at which to make the exposure. Thus, it will be noted that in the apparatus illustrated in Figs. 10 to 13 inclusive, the shutter and the diaphragm are set simultaneously and accurately due to the accurate measurement of the intensity of the light reflected from the object to be photographed into the case 47.

Photographs taken by the aid of my invention will illustrate the object photographed under the best conditions possible and good results can be insured under various light conditions.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:

1. An indicator of the character described including means having reflecting members spaced apart and through which light can penetrate to various extents in proportion to its intensity, and means relatively movable to said members and through the medium of which the reflected light from said members can be observed, substantially as described.

2. An indicator of the character described including means having reflecting members spaced apart and through which light can penetrate to various extents in proportion to its intensity, and means relatively movable to said members and through the medium of which the reflected light from said members can be observed, said members being positioned at an incline to the relative path of movement between said members and said last means whereby the light illuminating each member can be reflected through the space between the members and through said means, substantially as described.

3. An indicator of the character described including a plurality of translucent members arranged to successively receive and reflect light projected upon them, and means through the medium of which this reflected light can be observed, substantially as described.

4. An indicator of the character described including a plurality of translucent members spaced apart to successively receive and reflect light projected upon them, and means through the medium of which this reflected light from any of said members can be observed, substantially as described.

5. An indicator of the character described including a box having an opening therein, a plurality of translucent sheets within said box in alinement with said opening and spaced apart at various distances from said opening, a box cover having a series of slots respectively registering with the tops of the spaces between said sheets, said sheets being adapted to successively receive and reflect light, which is projected upon them through said opening, through said slots, and means through the medium of which this reflected light can be observed through any of said slots, substantially as described.

6. An indicator of the character described including a case having an opening to admit light into the interior thereof, a box movable in the path in which said light travels, said box having an opening to admit the light, a plurality of translucent sheets within said box in alinement with its opening and spaced apart and at various distances from said latter opening, a box cover having a series of slots respectively registering with the tops of the spaces between sheets, said sheets being adapted to successively receive and reflect light, which is projected upon them through said openings, through said slots, and means having a slit movable into alinement with any of the slots to permit reflected light from any of said sheets to pass through the slit to an observation point, said box being movable toward and from said first opening, substantially as described.

7. An indicator of the character described including a case having two compartments and an opening entering one of said compartments, a box movable within said latter compartment and having an opening in alinement with said first opening, a plurality of translucent sheets in said box spaced apart and at various distances from the opening therein, a cover for said box having a series of slots arranged respectively above the tops of the spaces between said sheets, movable means including a slit designed to be moved in register with any of said slots to receive reflected light from said sheets, a mirror adjacent said slit to reflect said light, said casing having a second opening into the second compartment, a second mirror arranged to reflect light projected from said first mirror through said latter opening, substantially as described.

8. An indicator of the character described including a case having two compartments and an opening entering one of said compartments, a box movable within said latter compartment and having an opening in alinement with said first opening, a plurality of translucent sheets in said box spaced apart and at various distances from the opening therein, a cover for said box having a series of slots arranged respectively above the tops of the spaces between said sheets, movable means including a slit designed to be moved in register with any of said slots to receive reflected light from said sheets, a mirror adjacent said slit to reflect said light, said casing having a second opening into the second compartment, a second mirror arranged to reflect light projected from said first mirror through said latter opening, and a tubular eyepiece connected to said latter opening, substantially as described.

9. An indicator of the character described including a case having two compartments and an opening entering one of said compartments, a box movable within said latter compartment and having an opening in alinement with said first opening, a plurality of translucent sheets in said box spaced apart and at various distances from the opening therein, a cover for said box having a series of slots arranged respectively above the tops of the spaces between said sheets, movable means including a slit designed to be moved in register with any of said slots to receive reflected light from said sheets, a mirror adjacent said slit to reflect said light, said casing having a second opening into the second compartment, a second mirror arranged to reflect light projected from said first mirror through said latter opening, and indicating means operatively connected respectively to said box and to the means having said slit, substantially as described.

10. An indicator of the character described including a box having an opening therein, and a plurality of translucent sheets spaced apart and in alinement with said opening whereby light can enter said opening and penetrate said sheets, said sheets being tilted at an incline to the direction of the light, a cover for said box having openings registering with the spaces between said sheets and whereby the light is reflected therethrough from said sheets, and means movable with respect to said slots to transmit said reflected light from any of said sheets, substantially as described.

In testimony whereof I have signed my name to this specification in the presence of two subscribing witnesses.

HENRY JOSEPH KUBIAK.

Witnesses:
 MARY A. INGLAR,
 CHAS. E. POTTS.